Jan. 3, 1939.  T. M. VOGEL  2,142,541
PROTECTION FOR ELECTRIC DISTRIBUTION SYSTEMS
Filed Sept. 19, 1935  2 Sheets-Sheet 1
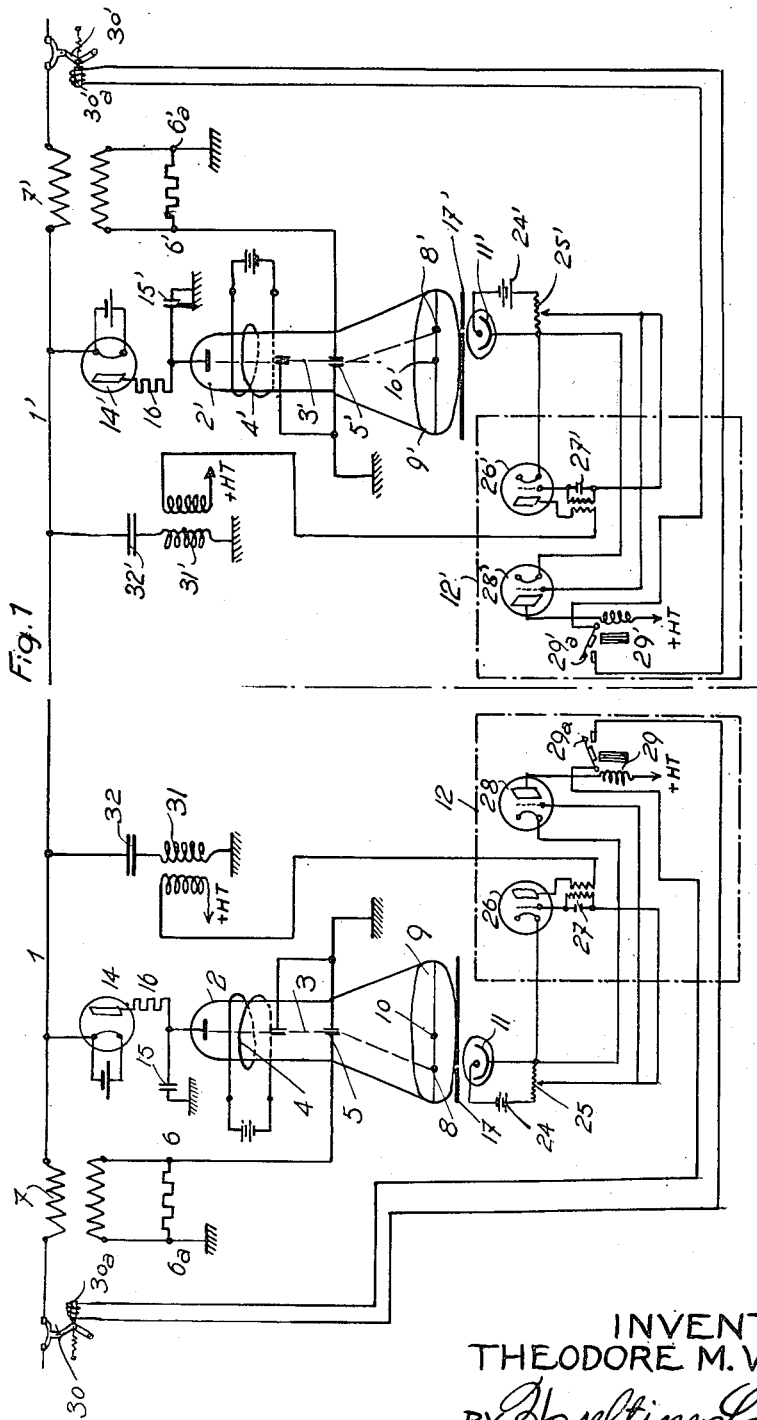
INVENTOR:
THEODORE M. VOGEL
BY Haseltine, Lake & Co.
ATTORNEYS Jan. 3, 1939.   T. M. VOGEL   2,142,541
PROTECTION FOR ELECTRIC DISTRIBUTION SYSTEMS
Filed Sept. 19, 1935   2 Sheets-Sheet 2
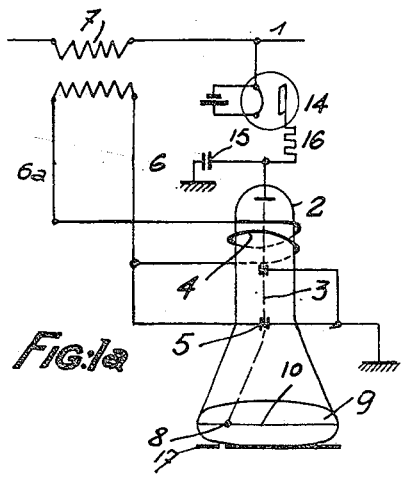
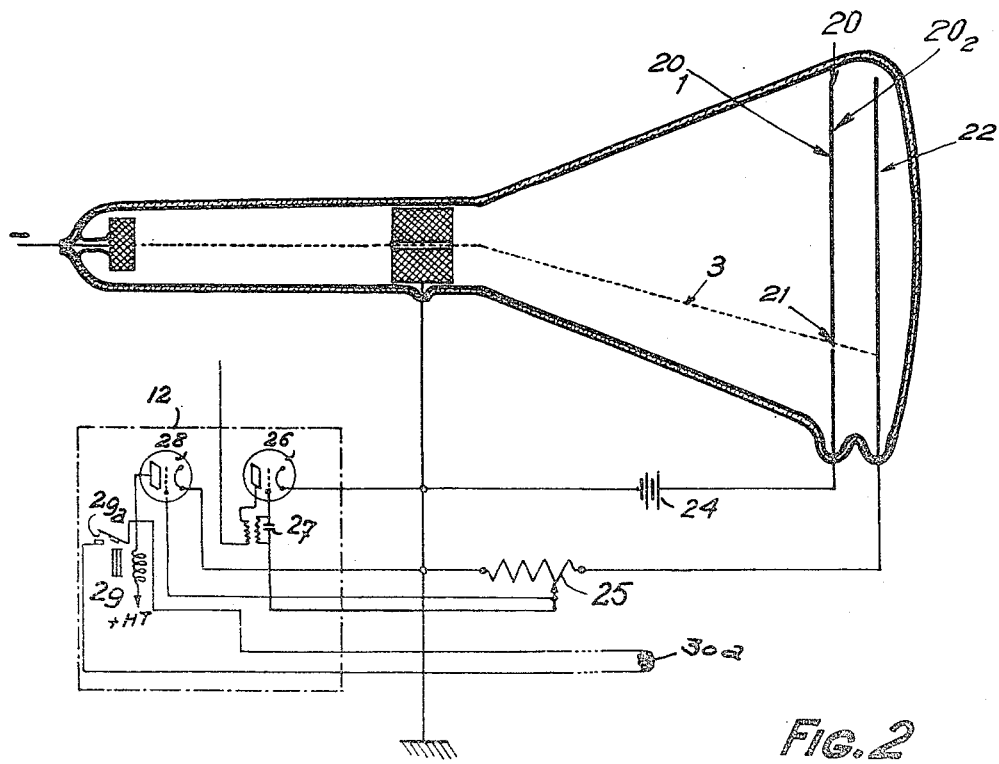
INVENTOR:
THEODORE M. VOGEL
BY Haseltine, Lake & Co.
ATTORNEYS Patented Jan. 3, 1939

2,142,541

UNITED STATES PATENT OFFICE 2,142,541

PROTECTION FOR ELECTRIC DISTRIBUTION SYSTEMS

Théodore Mathieu Vogel, Montrouge, France, assignor to Compagnie pour la Fabrication des Compteurs & Materiel d'Usines a Gaz, a corporation of France Application September 19, 1935, Serial No. 41,222
In France October 12, 1934

6 Claims. (Cl. 175—294)

It is known that the tendency at the present time is to increase as much as possible the rapidity of working of relays. In particular, this rapidity of working is not limited by that of the circuit-breakers, even when it is desired to select releases, because selection can always be obtained through special delaying devices. With relays making use of the movement of material elements, the possibilities shall always be limited by inertia, friction, etc. The principle of the present invention consists in making use, as means for detecting the defect and controlling the release, of physical agents the inertia of which is lower than, or equal to, that of electric currents, and especially light rays and cathode rays.

As a matter of fact, it is known that the cathodic rays produced in a Braun tube have a velocity proportional to the square root of the generating tension. It is further known that the deflections S of the cathode rays by electric fields $e$ and magnetic fields $h$ are governed by formulas bringing into play this velocity and the value of the field, to wit:

$$S = \frac{kh}{v^2} = \frac{ke}{v}$$

in which $v$ is the velocity in question.

According to the very principle of the present invention, the velocity of the rays of a cathodic beam is related to a characteristic factor (tension, current, impedance, etc.) of a power conveying line in such manner that, for any abnormal value of this factor, the cathodic beam energizes a photo-electric cell, intended to produce the operation of a circuit breaker.

The present invention also provides means making it unnecessary to rectify and filter the feed current and potential of the cathode ray tube. As a matter of fact, up to this time, this necessity constituted, in certain cases, a serious drawback which limited the field of application of the system of protection based on the principle according to the present invention. Another feature of the present invention consists in the provision of means capable of obviating this difficulty.

Other features of the present invention will result from the following detailed description of some specific embodiments thereof.

Preferred embodiments of the present invention will be hereinafter described, with reference to the accompanying drawings, given merely by way of example, and in which:

Fig. 1 is a diagrammatical view illustrating an embodiment of the invention in the particular case in which it is desired to have a protection system with a minimum of impedance, further making use of high frequency carrier waves;

Fig. 1a is a detail view of a modification;

Fig. 2 shows a modification of the Braun tube used according to the invention.

According to the invention, as illustrated by Fig. 1, a Braun tube 2 is subjected to the potential of the electric line 1, this potential being rectified and equalized through any suitable means (for instance a kenotron 14 and condenser 15). This potential produces an electronic flow or cathode beam 3, which, suitably concentrated through any suitable means, for instance the concentration coil 4, is subjected to the action of an electric field produced between the deflecting plates 5 and proportional to the current of said line. According to the present invention, this proportionality is obtained by inserting a resistance in shunt in the secondary of a current transformer 7 inserted in the line and connecting the two plates 5 respectively to the ends 6 and 6a of this resistance, one of said ends, 6a for instance, being earthed.

The beam 3 is deflected under the influence of the field thus produced between these deflecting plates and, considering the cathodic spot 8, which is the point at which the cathode beam impinges upon a fluorescent screen 9, the abscissa of said spot with respect to the center 10 of the screen is proportional to the field in question, that is to say to the current I in the electric line, and inversely proportional to the velocity $v$ of the electronic flow, that is to say to the potential U of the line. The amplitude of this deflection is therefore inversely proportional to the impedance of the line.

Furthermore, according to the present invention, there is provided a photo-electric cell 11, eventually hidden by a diaphragm 17, but arranged to be energized when the cathodic spot has a position corresponding to a suitably chosen minimum of impedance. This photo-electric cell is intended to control circuit-breakers such as 30 and 30', provided at either end of a line section 1—1', for protection thereof.

The cooperation of the photo-electric cells and the circuit breakers is obtained in any conventional manner, for instance as hereinafter described with reference to the drawings merely by way of example:

The electrodes of cell 11 are inserted in a circuit including a battery 24 and a resistance 25. The difference of potential created when the cell is energized controls, through said circuit, the grid of a triode 26 across a grid leak and condenser arrangement, illustrated at 27. The grid leak is coupled with the output inductance of the plate circuit of the triode, which inductance is connected to the positive terminal of the source of high tension HT, through coupling transformer 31. This transformer acts in the well known manner, through coupling condenser 32, to impress upon the line the superimposed signal that is to be transmitted through the line to the corresponding similar device on the right hand side of the drawing. (This device on the right hand side of the drawing is identical to that located on the left hand side of said drawing, which has just been described, corresponding parts being designated by the same reference characters with the sign '.)

If, in the system on the right hand side of the drawing, the disturbance in the electric line produces a predetermined deviation of the cathode rays beam 3' such that it energizes cell 11', the difference of potential created between the electrodes of this last mentioned cell polarizes the grid of triode 28' (cooperating with said cell as shown by the drawing) in such manner that the plate current can flow through the winding of relay 29' the armature 29a' of which is then attracted and closes the circuit of the coil 30a' of circuit breaker 30'.

If both of the cathode relays work simultaneously to the predetermined degree corresponding to the energizing of their respective cells 11 and 11', both of the high frequency emitting and receiving systems 12 and 12' (as constituted by the elements contained in the dot and dash rectangles of the drawing) will act simultaneously to open their circuit breakers 30 and 30', thus switching off section 1—1' of the line.

If the cathode ray tube is subjected to the action of an alternating difference of potential, the fluorescent screen is struck by the rays only for one alternation per period, the functions of the electrodes being reversed for the second half-wave and the rays then striking the electrode opposed to the fluorescent screen. Furthermore, the velocity of these rays varies during the useful alternation, in accordance with the very law of variation of the potential of the electric system (that is to say in accordance with a substantially sinusoidal law of variation). Under these conditions, the deflection of the cathode beam for a uniform magnetic field varies between infinity (for infinitely small velocities of the rays) and a minimum corresponding to the maximum of the anode potential. If, instead of a uniform magnetic field, an alternating field, created by the current of the electric system, is caused to act, (Fig. 1a, the battery feeding the coil 4 of the cathode tube being replaced by a shunt connection with the secondary of transformer 7) the deflection at a time $t$ shall be proportional to the value given by the following formula:

$$S = \frac{I \sin(\omega t - \varphi)}{U \sin \varphi}$$

in which I and U designate, respectively, the maximum values of the intensity and the potential, and $\varphi$ the angle which the current lags the potential, $\omega$ being equal to $2\pi f$, in which $f$ is the frequency. The value given by this formula has a maximum which is a function of $\varphi$ and therefore represents no characteristic constant of the electric system.

This case is transformed into that in which direct current is fed by imposing a dephasing $\varphi'$ to the circuit of the deviating coils, in order to compensate for the dephasing $\varphi$ of the electric system, the deviating magnetic field being then in phase with the current of the electric system and therefore with the anode potential of the tube, which is proportional thereto. The deflection remains uniform for the whole of the useful alternation, and proportional, as in the case of direct current feed, to the reciprocal of the impedance of the electric system (that is to say to its conductance).

As the dephasing $\varphi$ of an electric distribution system varies generally within rather close limits, it suffices to impose a compensating dephasing $\varphi'$ which is uniform and calculated to correspond to the mean value of $\varphi$. Under these conditions, there is obtained, on the fluorescent screen, instead of a punctual spot, a short portion of a straight line, the length of which depends upon the oscillations of the difference $(\varphi - \varphi')$; but as this difference remains always small, this slight modification of the shape of the spot does not modify the efficiency of the device, the impedance of the circuit being always, in the case of a disturbance, considerably different from what it is under normal conditions.

According to another embodiment of my invention, illustrated by Fig. 1a, in order to avoid the successive transformations of the electrical energy, I interpose, across the path of the cathode beam 3, an electrode forming an obturating screen 20, provided with a hole 21 and maintained at the same potential as the anode, or kept slightly negative with respect to said anode. All the electrons coming into contact with said screen are absorbed and cannot reach a second electrode, called collecting screen 22, located behind screen 20. If now the deflection of beam 3 is such that it passes through the opening 21, the electrons strike electrode 22, which is connected to the anode through resistance 23. Therefore, there flows through said resistance a current which is capable of producing the operation of the circuit breaker to be controlled. For this purpose, the drop of potential due to the flow, through resistance 23, of the electronic current of the cathode rays tube is made use of, either directly, or after previous amplification, for polarizing the grid of a discharge tube controlling the release coil of the circuit breaker, in the same manner as just above described with reference to Fig. 1. For instance, as shown by Fig. 2, the arrangement is similar to that of Fig. 1, resistance 25 playing a part analogous to that of resistance 25 in the arrangement of Fig. 1.

In order to amplify, in the cathode rays tube itself, the current supplied by the beam of cathode rays, electrode 22 is made of a material giving a strong secondary emission and face $20^2$ of electrode 20 receives the secondary emission from 22 and acts as an internal amplifier.

The applications above referred to have been given merely by way of example. For instance, the principle of the invention is applicable to the construction of relays, or even measurement or tele-measurement apparatus, which are responsive to variations of any quantity other than the impedance in an electric line.

In a general manner, while I have, in the above description, disclosed what I deem to be practical and efficient embodiments of the present invention, it should be well understood that I do not wish to be limited thereto as there might be changes made in the arrangement, disposition, and form of the parts without departing from the principle of the present invention as comprehended within the scope of the appended claims.

What I claim is:

1. A device for protecting a section of an electric distribution line against the effect of abnormal variations of a characteristic electrical factor in said line section, which comprises, in combination, a circuit breaker inserted in said line at each end of said section thereof, two means for operating said circuit breakers, respectively, said two means being interconnected in such manner as to work only when simultaneously energized, a cathode ray tube associated with each of said means, respectively, arranged to give a movable beam of cathode rays capable of energizing said means for a predetermined position of said beam, and electrical means, each coupled with the corresponding end of said line section, for controlling said cathode ray tube so as to move the respective beams of both of said tubes simultaneously into said predetermined positions for a predetermined variation of said characteristic factor inside said line section.

2. A device for protecting a section of an electric distribution line against the effect of abnormal variations of a characteristic electrical factor in said line section, which comprises, in combination, a circuit breaker inserted in said line at each end of said section thereof, two electrical devices for operating said circuit breakers, respectively, a photo-electric cell for controlling each of said devices, said two cells being interconnected in such manner as to work only when simultaneously energized, a cathode ray tube associated with each of said photo-electric cells, respectively, arranged to give a movable beam of cathode rays capable of energizing the corresponding photo-electric cell for a predetermined position of said beam, and electrical means, coupled with the coresponding end of said line section, for controlling said cathode ray tube so as to move the respective beams of both of said tubes simultaneously into said predetermined positions for a predetermined variation of said characteristic factor inside said line section.

3. A device for protecting a section of an electric distribution line against the effect of abnormal variations of a characteristic electrical factor in said line section, which comprises, in combination, a circuit breaker inserted in said line at each end of said section thereof, two electric circuits for operating said circuit breakers, respectively, said two circuits being interconnected in such manner as to work only when simultaneously closed, a cathode ray tube associated with each of said circuits, respectively, arranged to give a movable beam of cathode rays controlling the corresponding circuit so as to close said circuit for a predetermined position of said beam, and electrical means, each coupled with the corresponding end of said line section, for controlling said cathode ray tube so as to move the respective beams of both of said tubes simultaneously into said predetermined positions for a predetermined variation of said characteristic factor inside said line section.

4. A device for protecting a section of an electric distribution line against the effect of abnormal variations of a characteristic electrical factor in said line section, which comprises, in combination, a circuit breaker inserted in said line at each end of said section thereof, a cathode ray tube associated with each end of said line section, respectively, each of said tubes including an anode and a cathode and a circuit for connecting them to said line in such manner as to have in said tube a beam of cathode rays movable in response to variations of said factor at the corresponding end of said line section, and two supplementary electrodes, to wit an obturating screen provided with an opening and connected to said anode so as to be substantially at the same potential and a collecting screen mounted behind said first mentioned screen and adapted to receive the electrons conveyed from said cathode by said beam when the latter is directed onto said opening, a resistance inserted between the last mentioned electrode and said anode, and means operative by the drop of potential across said resistance for operating the corresponding circuit breaker, the respective last mentioned means corresponding to the two respective ends of the line section being so interconnected as to work only when simultaneously energized, that is to say when the respective cathode ray beams of the two cathode ray tubes occupy respective positions in which they pass through the openings existing in their respective obturating screens, said positions of the cathode ray beams corresponding to a predetermined variation of said characteristic factor inside said line section.

5. A device for protecting a section of an electric distribution line against the effect of abnormal variations of a characteristic electrical factor in said line section, which comprises, in combination, a circuit breaker inserted in said line at each end of said section thereof, a cathode ray tube associated with each end of said line section, respectively, each of said tubes including an anode and a cathode and a circuit for connecting said electrodes to said line in such manner as to have in said tube a beam of cathode rays movable in response to variations of said factor at the corresponding end of said line section, and two supplementary electrodes, to wit an obturating screen provided with an opening and connected to said anode so as to be substantially at the same potential, and a collecting screen mounted behind said first mentioned screen and adapted to receive the electrons conveyed from said cathode by said cathode ray beam when the latter is directed onto said opening, an amplifier adapted to operate the corresponding circuit breaker (including a discharge device having a grid, forming the first stage of said amplifier, and a resistance inserted between said last mentioned screen and the corresponding anode adapted to polarize said grid, the respective last mentioned systems for operation of the circuit breakers, corresponding respectively to the two ends of the line section, being interconnected in such manner as to work only when simultaneously energized, that is to say when the respective cathode ray beams of the two tubes occupy respective positions in which they pass through the openings provided in their respective obturating screens, said positions of the beams corresponding to a predetermined variation of said characteristic factor inside said line section.

6. A device for protecting a section of an alternating current electric distribution line against the effect of abnormal variations of a characteristic electrical factor in said line section, which comprises, in combination, a circuit breaker inserted in said line at each end of said section thereof, a cathode ray tube associated with each end of said section, respectively, each of said tubes including an anode and a cathode and means for coupling them to said line in such manner as to have in said tube a movable beam of cathode rays, a circuit including means operative by the current flowing through said line for deflecting said beam, in response to variations of said factor at the corresponding end of said line section, means for producing in said circuit a compensating dephasing opposed to that of said line and equal to the mean value thereof, whereby the deflecting means are substantially in phase with the anode potential of said tube, and means arranged to be controlled by each of said cathode ray beams for operating the corresponding circuit breakers, the respective last mentioned means, corresponding to the two respective ends of the line section being so interconnected as to work only when simultaneously energized, that is to say when the respective cathode beams of the two tubes occupy respective positions corresponding to a predetermined variation of said characteristic factor inside said line section.

THÉODORE MATHIEU VOGEL.